April 14, 1959     B. B. BLACKFORD     2,882,179
PROCESS FOR TREATING SHEET MATERIAL
Filed April 6, 1955
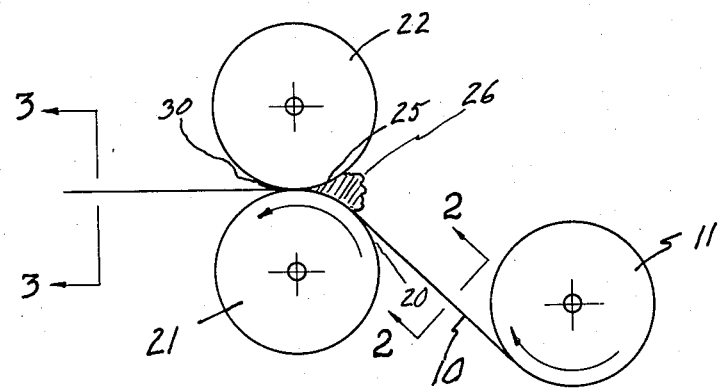
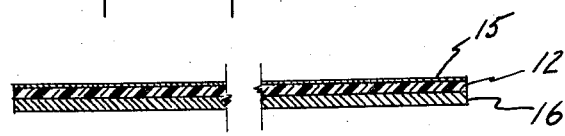
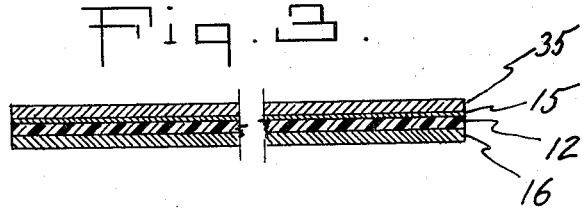
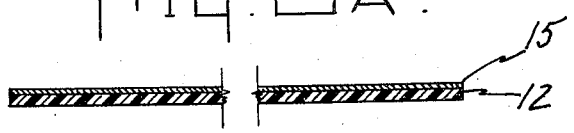
INVENTOR:
BENJAMIN B. BLACKFORD
ATTORNEY Patented Apr. 14, 1959

2,882,179

PROCESS FOR TREATING SHEET MATERIAL

Benjamin B. Blackford, Metuchen, N.J., assignor to Johnson & Johnson, a corporation of New Jersey Application April 6, 1955, Serial No. 499,584

7 Claims. (Cl. 117—47)

This invention relates to spreading of adhesive on a sheet of easily extensible plastic material to form a pressure-sensitive coating or mass thereon.

Usual procedures for calender-spreading an adhesive mass on a sheet of material require the use of a three-roll calender. Between the top and middle rolls there is maintained a bank of pressure-sensitive adhesive composition which is thermally conditioned by the rolls themselves. The mass is drawn into the nip between these rolls while the rolls rotate in the same surface direction. As the adhesive composition leaves the nip at the opposite side it is in the form of a thin film of desired and controlled thickness on the surface of the middle roll. The adhesive adheres to the middle roll. The middle and bottom rolls rotate at even speeds in the same surface direction. Into the nip between these rolls there is introduced a sheet of material which is to be coated with the adhesive. The film of adhesive on the middle roll, and the sheet of material meet at the nip between the middle and bottom rolls; and the adhesive is transferred from the middle roll to the sheet at this point, the adhesive being made to transfer from the roll surface to the sheet by its greater adhesion for the sheet.

It will be apparent that this three-roll calender performs two separate functions independently but in co-operation with each other. The first function, i.e. converting the shapeless mass of adhesive into a thin film of desired thickness, occurs between the top and middle rolls. The second function, or operation of applying the filmed adhesive to the sheet material, occurs between the middle and bottom rolls.

The foregoing operation has long been used to spread adhesive mass on substantially inextensible sheet, such as a woven fabric. When one attempts to use the technique in applying an adhesive mass to a sheet of easily extensible material, such as vinyl polymer sheets, one finds that there is a strong tendency for the plastic film to become distorted and stretched between the middle and bottom rolls by reason of the force which is necessary to pull the adhesive off the middle roll.

In an attempt to overcome these disadvantages of calender-spreading adhesive on an easily extensible plastic sheet, resort has been taken to solvent-spreading of adhesive, wherein the adhesive is dissolved in a solvent and applied to the extensible plastic film by various techniques such as reverse roll-coating operations. However, for manufacture of surgical adhesives which are to be applied to the skin, this type of operation has never been completely satisfactory due to the tendency of the adhesive to retain a small amount of solvent, even after apparent drying. The solvent in contact with the skin may, and frequently does, cause objectionable irritation, which is not true of adhesive masses applied by calender-spreading methods.

Attempts have been made to overcome the problems which have arisen by reason of the easy extensibility of plastic films by supporting the plastic films in temporary removable contact with substantially inextensible carrier sheets which are usually paper but may be other material including even metal. However, these devices have not solved the problem of calendering adhesive on the plastic film because when such a laminate is introduced between the middle and bottom rolls of the calender, the adhesive film to be transferred from the middle roll to the plastic film has a strong tendency rather to pull the vinyl film off the inextensible carrier sheet.

One object and advantage of the present invention is provision of an improved method by which an easily extensible plastic film may be calender-spread with an adhesive mass without objectionable distortion of the plastic film.

A further object and advantage of the invention resides in a method of calendering an adhesive onto an easily extensible plastic film with apparatus that is substantially simpler and less expensive than the standard three-roll calender heretofore thought necessary. According to the method of the invention simpler apparatus herein utilized performs simultaneously both operations of producing a thin film having uniform thickness from a shapeless mass of adhesive composition and applying this film to the backing sheet.

A particular object of the invention is to apply pressure-sensitive adhesive coating on an easily extensible plastic film removably supported on a substantially inextensible carrier or supporting sheet without lifting the inextensible plastic film from its carrier sheet.

According to the invention, a sheet of easily extensible plastic film is introduced into the space between the forward or leading portion of a roll member moving at the same surface speed as the sheet, and a second member closely adjacent the surface of the roll but spaced therefrom a distance sufficient to accommodate the plastic film and a layer of adhesive to be applied thereto.

The term "friction ratio" is commonly used to indicate the ratio of surface speeds of (1) the roll to which the spread film adheres to (2) the roll or other member which serves to press or otherwise spread the material into the form of a film. In the present case, for example, the friction ratio is the ratio of the surface speed of the roll to that of the said second member. According to the invention, the friction ratio is maintained above about 2:1 and even as high as infinity which corresponds with a stationary second member. A bank of pressure-sensitive adhesive is introduced and maintained between the forward portion of the sheet and the second member at a temperature high enough so that it will be pressure-formed into a film between the two members. Under these conditions adhesive is spread as an acceptably smooth layer on the easily extensible sheet without disrupting or distorting the sheet.

The invention and the various embodiments thereof may be conveniently understood by reference to the attached drawings considered together with the ensuing description.

Fig. 1 is a schematic presentation of apparatus which may be used to carry out the method of the invention.

Fig. 2 is a section of the sheet material to be treated taken on plane 2—2 of Fig. 1.

Fig. 3 is a transverse section of the sheet material after treatment taken on plane 3—3 of Fig. 1.

Fig. 2A shows a section of material which may be treated according to one particular embodiment of the invention, the section being taken at a point corresponding with plane 2—2 of Fig. 1.

A sheet of material 10 is unwound from supply roll 11. The composite sheet 10 may suitably comprise, in addition to the plastic itself shown at 12, a thin layer of primer 15 described in greater detail hereinafter. The purpose of the primer is to secure the best anchorage of the adhesive mass to the plastic film 12. On the undersurface of sheet 12 there is a sheet of substantially inextensible material 16, suitably paper, which, as explained below, is in removable contact with easily extensible sheet 12, and secured thereto with force sufficient to support film 20.

The easily extensible plastic films to which the invention is directed may be films of vinyl halide polymers and particularly the copolymers of major proportions of vinyl chloride with vinyl acetate, vinylidene chloride and/or maleic anhydride; vinylidene chloride polymers and particularly the copolymers of major proportions of vinylidene chloride with vinyl chloride, vinyl acetate, acrylonitrile and/or maleic anhydride. The fluorides and the bromides may be substituted for the chlorides in all the above-mentioned polymers with closely similar results as far as the present invention is concerned. Ethenoid polymer films and polyester or polyamide films may also find application. Plasticizers, such as known polymeric and/or low molecular weight plasticizers are preferably incorporated in the plastic film. The principles of the invention also apply to other types of easily extensible films.

The easily extensible plastic films which, as indicated above, give rise to the mass-spreading problems which are solved by the invention, may be 0.001 to 0.010 in. thick and have tensile strength of 1200 to 6000 p.s.i. and elasticity of 100% to 600% at break. By "easily extensible" is meant the quality of having an elongation of at least 50% at 5.0 lbs. per inch width tension when elongated at the rate of 20 inches per minute after conditioning at 70° F. and 65% relative humidity. However, they are self-sustaining in that they do not distort substantially under their own weight when under no external load, even though they are unsupported by a carrier sheet.

According to the invention, a primer may be spread on one surface of the plastic film, i.e. the surface subsequently to be covered with adhesive. The purpose of the primer is to effect better adherence and anchorage of pressure-sensitive adhesive mass to the plastic film. As a primer, equal parts of (1) a high molecular weight copolymer of 25% of acrylonitrile and 75% butadiene, (2) a copolymer of equal parts of styrene and butadiene having a Mooney viscosity of 50, dissolved in toluene and acetone may be utilized. The primer solution may be spread on the plastic film using conventional and known solvent-spreading technique. Such primers are described in U.S.P. 2,647,843, issued August 4, 1953, to C. W. Bemmels.

The bond between easily extensible plastic film 12 and substantially inextensible carrier sheet 16 is a superficial one, but such that the two sheets cohere strongly together to permit them to be handled as a unit in the necessary steps of further processing, the extensibility of the plastic being inhibited during such processing by the carrier. Coherence as the term was just used contrasts with a bond involving interlock of the opposed surfaces, which is characteristic of adhesive joints. While the factors which contribute to the effect may vary and be in part obscure, they are characterized by separability if the surfaces are pried apart at a point along an edge to admit air between them, i.e. the sheets cleave one to another, but one cleaves cleanly from the other without objectionable distortion of the plastic film. Releasability may be measured quantitatively by peeling back the plastic film at an angle of 180° while maintaining the carrier sheet flat. The rate of pull is a uniform speed of 12 inches per minute. The test is carried out at room temperature. The stripping force measured in ounces considered satisfactory according to the invention is in the approximate range ½ to 8 oz. per inch width of the interface between film and carrier.

The carrier or supporting sheet upon which the plastic film is supported may be any inextensible sheet material having a substantially fiber-free surface, preferably highly finished to avoid any "tooth" with which the plastic would interlock. Satisfactory sheets range from supercalendered kraft paper to parchment or glassine types of paper. Coated papers are also satisfactory. Suitable types of coating include hydrophilic materials such as glue, protein, polyvinyl alcohol, methyl cellulose, starch or carboxymethyl cellulose. Sufficient coating is applied to cover the fibers of the paper, but the amount of coating material is maintained below a value at which cracking may occur when the sheet is flexed or creased a single time.

Composite sheet 10 is introduced and advanced toward the forward or leading surface 20 of bottom calender roll 21. Disposed above roll 21 there is another roll 22 which also has a leading or forward surface 25. Between leading or forward surfaces 20 and 25 of the two rolls there is disposed and maintained a bank of thermoplastic pressure-sensitive adhesive composition 26. Any pressure-sensitive (rubber-resin type) adhesive may be utilized. Normally tacky and pressure-sensitive adhesives are those which need no activation by heat or solvent, but which adhere by mere pressure. Such compositions are world-known in the art and described in patent and other literature, for example U.S.P. 2,484,060, issued October 11, 1949, to H. A. Wing, and the above-mentioned Bemmels patent.

Pressure-sensitive adhesives based on synthetic elastomer are suitable. One particular group of pressure-sensitive adhesive is based on conjugated diene polymers such as butadiene polymers and natural rubber or vinyl ether polymers. The term "conjugated" is intended to include, among others, particularly butadiene, isoprene, pentadiene and methyl pentadiene.

Composite sheet 10 and forward surface 20 of smooth-surfaced steel roll 21 preferably advance at the same speed. Surface 25 of smooth-surfaced steel roll 22, on the other hand, moves in the same direction at a substantially lower speed, and may in fact even be stationary.

Adhesive mass bank 26 is drawn with sheet 10 into a thin film as it approaches nip 30 between the two rolls. Nip 30 is controlled so as to accommodate the thickness of sheet 10 and provide sufficient additional space for the desired thickness of adhesive mass.

As previously indicated, in prior art calendering operations it has been found that the adhesive tends to distort the plastic film, or in case the film is supported on a carrier, will tend to pull the film off the carrier. However, according to the present invention, by moving roll 21 and sheet 10 at a surface speed substantially higher than that of roll 22 (i.e. a high friction ratio) or even maintaining roll 22 stationary, the tendency of the adhesive mass to distort film 12 is materially and critically reduced, and hence the adhesive film may be calender-spread on the easily extensible plastic film without distorting or otherwise adversely affecting the extensible film. The adhesive-coated sheet is shown in Fig. 3 with a layer of adhesive mass 35 of desired thickness secured thereto.

Roll 22 in its function as a member which moves at a speed substantially slower than sheet 10, may be replaced with a spreading knife or similar member. In order to provide the desired function between spreading member, e.g. roll 22 and the adhesive film 35, the ratio of surface speeds between sheet 10 and surface 25 should be at least 2:1. In the case of a stationary knife or stationary roll 22, this ratio, of course, will be infinity. At relatively high speeds of roll 22, the tendency of the adhesive film to disrupt the plastic film may increase. Accordingly, it is preferred to maintain this ratio above about 10:1.

If for any reason it may be desired to do so, additional rolls may be supplied above and cooperating with roll 22 to spread the adhesive into a film. In each case, however, the friction ratio is maintained as described above between the members which apply the adhesive to the film.

The temperature of rolls 21 and 22 is preferably maintained sufficiently high to keep bank 26 in a highly plastic condition so that it will be filmed out as desired in nip 30. Further, depending on the mass composition and the type of surface 25 on roll 22, conditions are maintained to permit substantial non-adherence of the adhesive to the surface of roll 22 by control of relative surface speeds as described above. This may be done by holding the top roll temperature higher than the bottom roll. Preferably, the temperature of top roll 22 may be above about 200° F. and that of bottom roll 21 below about 200° F.

Instead of feeding or introducing extensible film 12 and carrier or supporting sheet 16 as a composite laminate into the adhesive-spreading zone adjacent nip 30 these two sheets—plastic film and carrier—may be introduced separately thereto. In this case, the sheet material consisting of easily extensible plastic sheet 12, preferably having a layer of primer 15 spread thereon, is shown in Fig. 2A. A satisfactory carrier sheet may be selected from the group of suitable materials described above in connection with the composite sheet shown in Fig. 2.

Following is an example by which the process of the invention may be carried out to produce the desired products.

*Example*

An adhesive mass formulation having the following composition was prepared:

| | Percent |
|---|---|
| Rubber (natural) | 33 |
| Resin (glycerol ester of hydrogenated rosin) | 28 |
| Zinc oxide | 31 |
| Lanolin | 7 |
| Antioxidant | 1 |

A composite sheet of vinyl polymer film removably supported and secured to a substantially inextensible carrier sheet was selected as a starting material. The composition of the plastic film was as follows:

| | Parts |
|---|---|
| Polyvinyl chloride QYSQ | 100.00 |
| "Paraplex G–50" (Polymeric plasticizer) | 17.45 |
| Tricresyl phosphate (low molecular weight plasticizer) | 21.42 |
| Stabilizer | 2.29 |
| Pigment | 11.17 |

The carrier paper was supercalendered kraft having substantially fiber-free surface and a thickness of about 5 mils, i.e. .005 in. The thickness of the vinyl polymer film was about 2.7 mils. The vinyl polymer film was covered with a primer of the type described above, the thickness of the primer being about ¼ mil. The operation was carried out in apparatus of the type shown in Fig. 1. The temperature of top roll 22 was 260° F., while the temperature of bottom roll 21 was 175° F. Top roll 22 was operated at a speed 1/20 of the speed of the bottom roll (i.e. friction ratio 20:1). The clearance between the rolls in nip 30 was sufficient to produce an adhesive mass on plastic film 20 that was about 2¼ mils thick. Adhesive layer 35 was applied to the sheet 10 without pulling plastic film 12 away from carrier sheet 16 or otherwise distorting film 12.

Although various particular embodiments of the invention have been described and illustrated in the foregoing presentation, it will be apparent to those skilled in the art that there are many modifications and equivalents within the spirit of the invention. Accordingly, it is intended to include such modifications and equivalents within the scope of protection as defined in the appended claims.

The claims are:

1. The method of spreading a pressure-sensitive thermoplastic adhesive mass from a thermoplastic bank which comprises introducing concurrently a continuous sheet of easily extensible plastic and a substantially inextensible carrier sheet into an adhesive spreading zone formed by the surface of a roll member and the surface of a second member disposed closely adjacent said roll member with sufficient space therebetween to permit passage of said plastic and carrier sheets and a layer of adhesive mass to be applied thereto, maintaining a bank of pressure-sensitive thermoplastic adhesive in said zone, and rotating said roll at substantially the same peripheral speed as said sheet while maintaining the ratio of the surface speed of said roll member to the surface speed of said second member above about two to one, thereby to spread said adhesive into a film that adheres to said plastic sheet, does not adhere substantially to the surface of said second member, and does not remove said plastic film from said carrier sheet.

2. The method of spreading a pressure-sensitive thermoplastic adhesive mass from a thermoplastic bank which comprises introducing concurrently a continuous sheet of easily extensible plastic and a substantially inextensible carrier sheet into an adhesive spreading zone formed by the surface of a first roll member and the surface of a second roll member disposed closely adjacent said first roll member with sufficient space therebetween to permit passage of said plastic and carrier sheets and a layer of adhesive mass to be applied thereto, maintaining a bank of pressure-sensitive thermoplastic adhesive in said zone, and rotating said first roll at substantially the same peripheral speed as said sheet while maintaining the ratio of the surface speed of said first roll member to the surface speed of said second roll member above about ten to one, thereby to spread said adhesive into a film that adheres to said plastic sheet, does not adhere substantially to the surface of said second roll member, and does not remove said plastic film from said carrier sheet.

3. The method of spreading a pressure-sensitive thermoplastic adhesive mass from a thermoplastic bank which comprises introducing concurrently a continuous sheet of easily extensible vinyl polymer and a substantially inextensible carrier sheet into an adhesive spreading zone formed by the surface of a first roll member and the surface of a second roll member disposed closely adjacent said first roll member with sufficient space therebetween to permit passage of said vinyl polymer and carrier sheets and a layer of adhesive mass to be applied thereto, maintaining a bank of pressure-sensitive thermoplastic adhesive in said zone, and rotating said first roll at substantially the same peripheral speed as said sheet while maintaining the ratio of the surface speed of said first roll member to the surface speed of said second roll member above about ten to one, thereby to spread said adhesive into a film that adheres to said vinyl polymer sheet, does not adhere substantially to the surface of said second roll member, and does not remove said vinyl polymer film from said carrier sheet.

4. The method of spreading a pressure-sensitive thermoplastic adhesive mass from a bank which comprises introducing a continuous laminated sheet of easily extensible plastic releasably secured to a substantially inextensible carrier sheet into an adhesive spreading zone formed by the surface of a roll member and the surface of a second member disposed closely adjacent said roll member with sufficient space therebetween to permit passage of said plastic and carrier sheets and a layer of adhesive mass to be applied thereto, maintaining a bank of pressure-sensitive thermoplastic adhesive in said zone, and rotating said roll at substantially the same peripheral speed as said sheet while maintaining the ratio of the surface speed of said roll member to the surface speed of said second member above about two to one, thereby to spread said adhesive into a film that adheres to said plastic sheet, does not adhere substantially to the surface of said second member, and does not remove said plastic film from said carrier sheet.

5. The method of spreading a pressure-sensitive thermoplastic adhesive mass from a bank which comprises introducing a continuous laminated sheet of easily extensible plastic releasably secured to the smooth surface of a substantially inextensible carrier sheet having a smooth substantially fiber-free surface into an adhesive spreading zone formed by the surface of a first roll member and the surface of a second roll member, consisting of a smooth surfaced steel roll, disposed closely adjacent said first roll member with sufficient space therebetween to permit passage of said plastic and carrier sheets and a layer of adhesive mass to be applied thereto, maintaining a bank of pressure-sensitive thermoplastic adhesive in said zone, and rotating said first roll at substantially the same peripheral speed as said sheet while maintaining the ratio of the surface speed of said first roll member to the surface speed of said second roll member above about two to one, thereby to spread said adhesive into a film that adheres to said plastic sheet, does not adhere substantially to the surface of said second roll member, and does not remove said plastic film from said carrier sheet.

6. The method of spreading a pressure-sensitive thermoplastic adhesive mass from a bank which comprises introducing a continuous laminated sheet of easily extensible plastic releasably secured to the smooth surface of a substantially inextensible carrier sheet having a smooth substantially fiber-free surface into an adhesive spreading zone formed by the surface of a first roll member and the surface of a second roll member, consisting of a smooth surfaced steel roll, disposed closely adjacent said first roll member with sufficient space therebetween to permit passage of said plastic and carrier sheets and a layer of adhesive mass to be applied thereto, maintaining a bank of pressure-sensitive thermoplastic adhesive in said zone, and rotating said first roll at substantially the same peripheral speed as said sheet while maintaining the ratio of the surface speed of said first roll member to the surface speed of said second roll member above about two to one, thereby to spread said adhesive into a film that adheres to said plastic sheet, does not adhere substantially to the surface of said second roll member, and does not remove said plastic film from said carrier sheet, said plastic sheet onto which said adhesive mass is spread being formed of a self-supporting vinyl polymer having an elongation of at least 50% at 5.0 lbs. per inch width tension when elongated at the rate of 20 inches per minute after conditioning at 70° F. and 65% relative humidity, and having a surface primed to receive said adhesive mass.

7. The method of spreading a pressure-sensitive thermoplastic adhesive mass from a bank which comprises introducing a continuous laminated sheet of easily extensible plastic releasably secured to the smooth surface of a substantially inextensible carrier sheet having a smooth substantially fiber-free surface into an adhesive spreading zone formed by the surface of a first roll member having a temperature substantially below 200° F. and the surface of a second roll member having a temperature above 200° F., consisting of a smooth surfaced steel roll, disposed closely adjacent said first roll member with sufficient space therebetween to permit passage of said plastic and carrier sheets and a layer of adhesive mass to be applied thereto, maintaining a bank of pressure-sensitive thermoplastic adhesive in said zone, and rotating said first roll at substantially the same peripheral speed as said sheet while maintaining the ratio of the surface speed of said first roll member to the surface speed of said second roll member above about two to one, thereby to spread said adhesive into a film that adheres to said plastic sheet, does not adhere substantially to the surface of said second roll member, and does not remove said plastic film from said carrier sheet, said plastic sheet onto which said adhesive mass is spread being formed of a self-supporting vinyl polymer having an elongation of at least 50% at 5.0 lbs. per inch width tension when elongated at the rate of 20 inches per minute after conditioning at 70° F. and 65% relative humidity, and having a surface primed to receive said adhesive mass.

References Cited in the file of this patent

UNITED STATES PATENTS

| | | |
|---|---|---|
| 2,054,113 | Abrams | Sept. 15, 1936 |
| 2,089,524 | Abrams | Aug. 10, 1937 |
| 2,089,525 | Abrams | Aug. 10, 1937 |
| 2,236,567 | Drew | Apr. 1, 1941 |
| 2,328,057 | Coulter | Aug. 31, 1943 |
| 2,571,962 | Smith | Oct. 16, 1951 |